April 14, 1959 W. A. HYLAND ET AL 2,881,721
TRACTOR MOUNTED GRAIN DRILL
Filed Nov. 1, 1955

INVENTORS.
WILLIAM A. HYLAND
ERNST E. SCHNELL
BY
ATTORNEYS

United States Patent Office 2,881,721
Patented Apr. 14, 1959

2,881,721

TRACTOR MOUNTED GRAIN DRILL

William A. Hyland, Horicon, and Ernst E. Schnell, West Bend, Wis., assignors, by mesne assignments, to Deere & Company, a corporation of Delaware Application November 1, 1955, Serial No. 544,140

1 Claim. (Cl. 111—85)

The present invention relates generally to agricultural implements and more particularly to grain drills and other planting implements of the type that are carried on a tractor having power operated mechanism for raising and lowering the planting apparatus into and out of transport and operating positions.

The object and general nature of the present invention is a provision of a planting implement, such as a grain drill, for example, of the integral or tractor-carried type in which the furrow openers are mounted on spring arms and in which the usual pressure shafts, pressure arms, pressure rods and springs are eliminated. More specifically, it is a feature of this invention to provide a planting implement, such as a grain drill, with furrow opening means, each supported on a pair of spring arms fixedly connected with the grain drill frame and arranged to have vertical resilience but held against appreciable lateral displacement. Another feature of this invention is the provision of new and improved means for clamping or fixing the spring arms to the associated supporting part of the implement frame, and still further, a feature of this invention is the provision of means for adjusting the supporting part so as to vary the pressure by which the furrow openers are pressed toward the ground for a given position of the implement frame, as determined by the position of the implement-supporting means of the tractor.

A further feature of this invention is the provision of a planting implement, such as a grain drill, in which the grain drill is supported on a tractor and raised and lowered thereby for varying the pressure applied to the furrow openers, with means for limiting the downward deflection of the spring arms carrying the furrow openers, when the implement is raised into a transport position, so that the furrow openers are held out of contact with the ground.

These and other objects and advantages of the present invention will be apparent to those skilled in the art after a consideration of the following detailed description, taken in conjunction with the accompanying drawings, in which:

Figure 1:
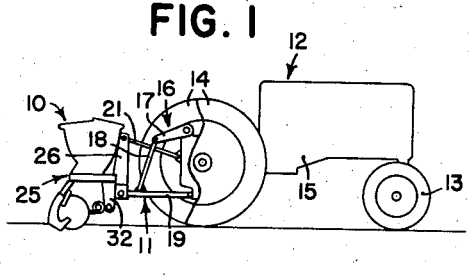
Fig. 1 is a diagrammatic view showing in side elevation a grain drill of the integral or tractor-supported type in operating or planting position.

Referring first to Fig. 1, the principles of the present invention have been shown by way of illustration as embodied in a grain drill 10 mounted upon a three-point linkage arrangement 11 that is connected with a farm tractor 12, the latter being of generally conventional construction so far as the present invention is concerned, embodying front wheel means 13, rear drive wheels 14, suitable power means 15, and a power actuated lift apparatus 16, preferably hydraulic, embodying a pair of lift arms 17 connected by lift links 18 to the lower draft links 19 of the hitch structure 11, the upper link of the hitch structure 11 being indicated at 21.

The implement 10 chosen to illustrate the principles of the present invention takes the form of a grain drill having a frame 25 extending generally horizontally transverse or to the direction of forward travel, and the frame means includes a vertical hitch structure 26 having suitable means receiving the rear ends of the draft links 19 and upper link 21 of the hitch structure 11. The frame 25 also includes front and rear transverse members 28 and 29, end members 31, depending brackets 32, one at each end of the frame, and intermediate brackets 33, the brackets 32 and 33 being apertured to rockably receive a supporting member 34, preferably in the form of a pipe.

The supporting bar 34 is adapted to be fixed in different positions angularly about its longitudinal axes, and means to this end comprises an arm 38 fixed to each end portion of the pipe member 34 and provided with a plurality of apertures 39 adapted to selectively receive a connecting bolt 41 that is disposable in selected openings 42 formed in the adjacent associated bracket 32.

Figure 4:
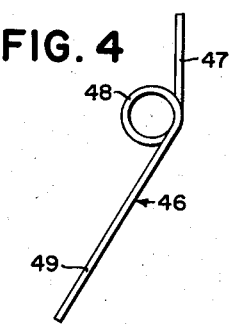
Fig. 4 is a side view of one of the spring arms disconnected from the associated structure.

The supporting bar 34 is provided with a plurality of pairs of apertures 45 extending generally vertically through the member 34. Associated with each of the openings 45 is a spring arm 46, each spring arm including an upper generally vertical section 47, a coil section 48, and a generally rearwardly extending section 49, as best shown in Fig. 4. The number of turns in the coil section 48 may be any suitable number, depending upon the amount of resilience or flexibility desired. Preferably, the turns are sufficient to provide approximately uniform pressure over about 30° of adjustment of the supporting bar 34. This is for the purpose of maintaining substantially even pressure against the associated furrow openings 50 that are connected to the rear portions 49 of the spring arms 46.

Figure 3:
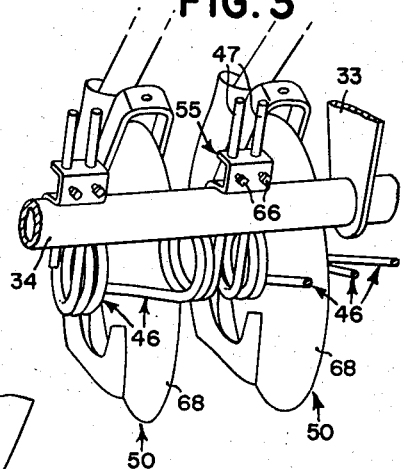
Fig. 3 is a fragmentary perspective view showing one form of connecting means fixing the forward portions of the spring arms to the associated supporting bar of the implement frame.
Figure 2:
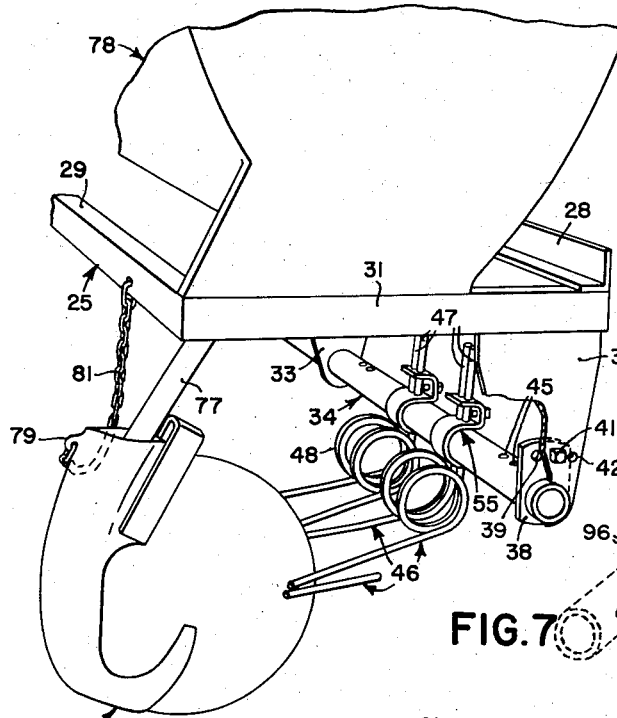
Fig. 2 is a fragmentary perspective view of the grain drill shown in Fig. 1, certain parts being broken away.
Figure 5:
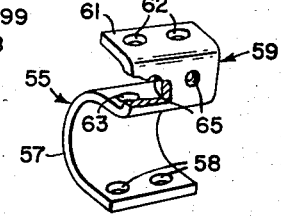
Fig. 5 is a perspective view of one of the spring arm attaching brackets shown in Figures 2 and 3.

The vertical ends 47 of the spring arms 46 are disposed in the openings 45 of the bar 34 so as to occupy the positions shown generally in Figs. 2 and 3. In order to hold a forward portion of each spring arm 46 in place, I provide a plurality of brackets 55. Each bracket, as best shown in Fig. 5, comprises a lower half-cylinder section 57, curved to fit around the pipe member 34, and provided at its lower edge portion with a pair of openings 58, and an upper right angle section 59 having an upper flange 61 provided with a pair of openings 62. The openings 58 and 61 are in vertical alinement and are also alined with a pair of openings 63. The vertical portion of the section 59 is provided with a pair of tapped openings 65 that are adapted to receive a pair of fastening set screws 66, as best shown in Fig. 3. The bracket structure 55 is adapted to be placed over the bar 34 by engaging the latter with the curved section 57 embracing the bar and with the openings 58 and 63 alined with the openings 45 in the associated portion of the bar 34. Then the vertical spring arm sections 47 are inserted upwardly through the alined openings in the bracket 55 and the openings in the bar 34. Then by tightening the set screw 65, the two spring arms are firmly fixed to the bracket 55, and since the curved portions 57 of the latter embraces the bar 34, the spring arms are fixed to the bar 34. The spring arm sections 47 are of sufficient length to provide for some vertical adjustment of the spring arm relative to the brackets 55 and the bar 34, which may be effected by loosening the set screw 65 and shifting the arms 46 in the desired direction.

Figures 6, 7:
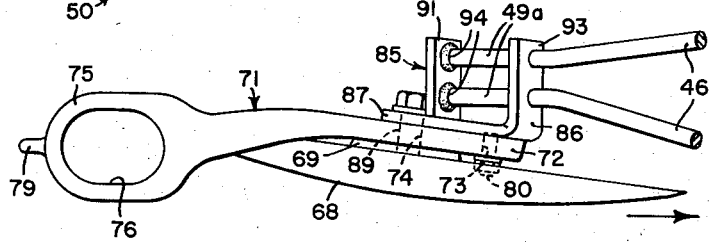
Fig. 6 is a fragmentary plan view showing the means connecting the rear ends of the spring arms to the associated furrow openers.
Fig. 7 is a fragmentary perspective view showing a modified form of means connecting the forward portions of the spring arms with the supporting bar of the implement frame.

It will best be seen in Fig. 6, each of the furrow openers 50 comprises a disk type furrow opener 68 mounted for rotation, as by bearing means 69, on a boot casting 71 having a forward section 72 provided with a pair of openings 73 and 74 and the rear enlarged section 75 in which the seed passage 76 is formed. The upper portion of the passage 76 is in communication with the seed tube 77 that leads upwardly to dispensing mechanism (not shown) carried in a hopper 78 that is mounted on the grain drill frame 25. An apertured lug 79 is formed on the upper rear portion of the member 71 and receives the chain 81 that is connected at its upper end with the rear frame bar 29 and serves the purpose of limiting the downward movement of the associated furrow opener when the grain drill is lifted off the ground and into a transport position, as by operation of the tractor power lift mechanism 16.

As will best be seen in Figs. 2, 3 and 6, the spring arms 46 are arranged in pairs, each pair providing supporting and connecting means for a furrow opener 50. To this end, the spring arms 46 of each pair are arranged on the bar 34 with the forward portion disposed in laterally spaced apart relation and with their rear extending sections 49 converging rearwardly so as to dispose the rear ends 49a closely adjacent one another and extending generally parallel, as will best be seen in Fig. 6. Bracket means 85 is provided for each furrow opener to mount the latter on the end sections 49a of the associated spring arms. Each bracket means 85 comprises an angle member 86 having one leg portion 87 provided with through apertures to receive bolt means 88 and 89 by which the member 86 is fastened to the forward portion of the associated boot casting 71. The bracket 85 is completed by the bar section 91 that is welded to the leg 87 and is apertured to provide openings in fore-and-aft alinement with corresponding openings formed in the leg section 93 of the angle member 86, the rear ends 49a of the associated spring arms being fixed, as by welding 94, to the bracket 85. By virtue of the fact that each furrow opener 50 is supported by a pair of spring arms, the forward end portions of which are fixed to supporting bar 34 in laterally spaced apart relation, the furrow openers 50 are held against appreciable lateral displacement, but each furrow opener is capable of moving generally vertically so as to follow irregularities in the ground surface when the grain drill is in operating position, as shown in Fig. 1. It was mentioned above that each spring arm 46 includes a coil section 48 which provides for substantially uniform pressure through substantially 30° of vertical displacement. When the grain drill is raised into a transport position, the resiliency of the spring arms would permit the furrow openers 50, once they are out of contact with the ground, to oscillate generally vertically, but this is prevented by the chains 81. Normally, as in operation, the chains 81 are slack and do not interfere with the ability of the furrow openers 50 to follow uneven ground surfaces.

The pressure applied to the furrow through the spring arms 46 when the grain drill is in operating position may be adjusted, not only by virtue of the vertical adjustment permitted by the vertical section 47 and the set screw means 65, whereby any one or more of the spring arms may be raised or lowered in the pipe member 34, but also adjustment is provided by virtue of the bolts 41 and the means whereby they may be used to fasten the adjusting arms 38 to the end brackets 32 in different positions.

A modified form of the invention, particularly as regards the connections between the forward ends of the spring arm 46 and the pipe member 34, is shown in Fig. 7. In this form of the invention, the brackets 55 are replaced by a curved bracket 95 formed generally as a half cylinder and having upper and lower openings 96 and 97 to receive the ends 47 of the associated spring arms. The central portion of each of the brackets 95 is provided with a tapped opening 98 to receive a set screw 99 that, when tightened, serves to fix the spring arms to the bracket 95 and the latter and the spring arms to the pipe member 34.

While I have shown and described above the preferred structure in which the principles of the present invention have been incorporated, it is to be understood that my invention is not to be limited to the particular means shown and described above, but that, in fact, widely different means may be employed in the practice of the broader aspects of my invention.

What we claim, therefore, and desire to secure by Letters Patent is:

In a grain drill, a frame including a supporting bar, a plurality of spring arms fixed at their forward ends to said bar in laterally spaced apart relation and arranged in pairs, the arms of each pair converging rearwardly, a bracket fixed to the rear ends of the bars of each pair, a furrow opener mounted on each bracket, said spring arms comprising rod-like parts, said bracket including a pair of parts arranged in fore-and-aft spaced relation and apertured to receive the adjacent rear ends of the associated spring arms, and means fixing said ends to said pair of bracket parts.

References Cited in the file of this patent

UNITED STATES PATENTS

| | | |
|---|---|---|
| 408,234 | Hamilton | Aug. 6, 1889 |
| 425,210 | Cobb | Apr. 8, 1890 |
| 559,336 | Kirkpatrick et al. | Apr. 28, 1896 |
| 612,043 | King | Oct. 11, 1898 |
| 716,912 | MacPhail | Dec. 30, 1902 |
| 745,197 | Kingsbury | Nov. 24, 1903 |
| 2,274,227 | Willard | Feb. 24, 1942 |
| 2,476,863 | Hawes | July 19, 1949 |
| 2,605,073 | Buck | July 29, 1952 |
| 2,750,861 | Erwin | June 19, 1956 |